(12) United States Patent
Takahashi

(10) Patent No.: US 11,290,631 B2
(45) Date of Patent: Mar. 29, 2022

(54) IMAGE CAPTURE APPARATUS, IMAGE CAPTURE SYSTEM, AND CONTROL METHOD

(71) Applicant: CANON KABUSHIKI KAISHA, Tokyo (JP)

(72) Inventor: Hayato Takahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/178,120

(22) Filed: Feb. 17, 2021

(65) Prior Publication Data

US 2021/0266451 A1    Aug. 26, 2021

(30) Foreign Application Priority Data

Feb. 21, 2020 (JP) .............................. JP2020-028054

(51) Int. Cl.
| | |
|---|---|
| *H04N 7/18* | (2006.01) |
| *H04N 5/77* | (2006.01) |
| *H04N 5/232* | (2006.01) |
| *H04N 5/247* | (2006.01) |
| *G06T 7/20* | (2017.01) |

(52) U.S. Cl.
CPC ........... *H04N 5/23203* (2013.01); *G06T 7/20* (2013.01); *H04N 5/23218* (2018.08); *H04N 5/23299* (2018.08); *H04N 5/232939* (2018.08); *H04N 5/247* (2013.01); *H04N 5/77* (2013.01)

(58) Field of Classification Search
CPC .. G06T 7/20; H04N 5/23203; H04N 5/23218; H04N 5/232939; H04N 5/23299; H04N 5/247; H04N 5/77
USPC ........ 348/144, 142, 139, 143, 151; 386/223, 386/224, 226
See application file for complete search history.

(56) References Cited

U.S. PATENT DOCUMENTS

| | | | |
|---|---|---|---|
| 2017/0278255 A1* | 9/2017 | Shingu | H04N 5/247 |
| 2018/0249128 A1* | 8/2018 | Gu | G06T 7/292 |

FOREIGN PATENT DOCUMENTS

| | | | |
|---|---|---|---|
| JP | 2001025003 A | | 1/2001 |
| JP | 3643513 B2 | * | 4/2005 |
| JP | 3852745 B2 | * | 12/2006 |

* cited by examiner

*Primary Examiner* — Robert Chevalier
(74) *Attorney, Agent, or Firm* — Canon U.S.A., Inc. IP Division

(57) ABSTRACT

An image capture apparatus includes an image capture unit that captures an image, a communication unit that communicates with another image capture apparatus, a determination unit that determines whether the another image capture apparatus is in an imaging area of the image capture unit, and an instruction unit that instructs the another image capture apparatus to move outside of the imaging area of the image capture unit in a case where the another image capture apparatus is in the imaging area of the image capture unit.

20 Claims, 7 Drawing Sheets

IMAGE CAPTURE APPARATUS, IMAGE CAPTURE SYSTEM, AND CONTROL METHOD

BACKGROUND

Field of the Disclosure

Aspects of the disclosure generally relate to an image capture apparatus, an image capture system, and a method for changing an image capturing field angle (a position and an image capturing direction of an image capture apparatus).

Description of the Related Art

There is known an image capture system for capturing an image of a subject by using cameras. In such an image capture system, it is common that a human manually controls the postures of all the cameras and also controls image capturing by each of the cameras. However, there is a limit on such manual control by a human controlling all of the cameras to perform image capturing thereby, for example, in a case of capturing an image of a moving subject.

To solve the issue, for example, Japanese Patent Application Laid-Open No. 2001-25003 discusses an image capture system that performs a control such that a main camera identifies a position of an object (subject) based on an image capturing direction and a distance and sub-cameras is directed to the object. After identifying the object (subject), the main camera and the sub-cameras each detect the object and control their own image capturing directions to capture an image of the object while tracking the object.

In the image capture system discussed in Japanese Patent Application Laid-Open No. 2001-25003, however, the positional relationship between the main camera and the sub-cameras is not taken into consideration when the main camera and the sub-cameras each capture an image of the object. Thus, one camera may be reflected in an imaging area of another camera, and thus, the captured image may be undesirable especially in a case of acquiring an ornamental image.

SUMMARY

According to an aspect of the embodiments, there is provided an image capture system that includes a first image capture apparatus; a second image capture apparatus; a determination unit of the first image capture apparatus configured to determine whether the second image capture apparatus is in an imaging area of an image capture unit included in the first image capture apparatus; and an instruction unit of the first image capture apparatus configured to instruct the second image capture apparatus to move outside the imaging area of the image capture unit included in the first image capture apparatus in a case where the second image capture apparatus is in the imaging area of the image capture unit included in the first image capture apparatus.

According to an aspect of the embodiments, there is provided an image capture apparatus that includes an image capture unit configured to capture an image; a communication unit configured to communicate with another image capture apparatus; a determination unit configured to determine whether the another image capture apparatus is in an imaging area of the image capture unit; and an instruction unit configured to instruct the another image capture apparatus to move outside of the imaging area of the image capture unit in a case where the another image capture apparatus is in the imaging area of the image capture unit.

According to an aspect of the embodiments, there is provided a method that includes causing a determination unit of a first image capture apparatus to determine whether a second image capture apparatus is in an imaging area of an image capture unit included in the first image capture apparatus; and causing an instruction unit of the first image capture apparatus to instruct the second image capture apparatus to move outside of the imaging area of the image capture unit included in the first image capture apparatus in a case where the second image capture apparatus is in the imaging area of the image capture unit included in the first image capture apparatus.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

Next, a first exemplary embodiment will be described. An image capture system according to the first exemplary embodiment will be described in detail in FIGS. 1, 2, and 3. This configuration example is merely an example, and the disclosure is not limited to the first exemplary embodiment and should be appropriately changed and applied depending on a circuit configuration.

Figure 1:
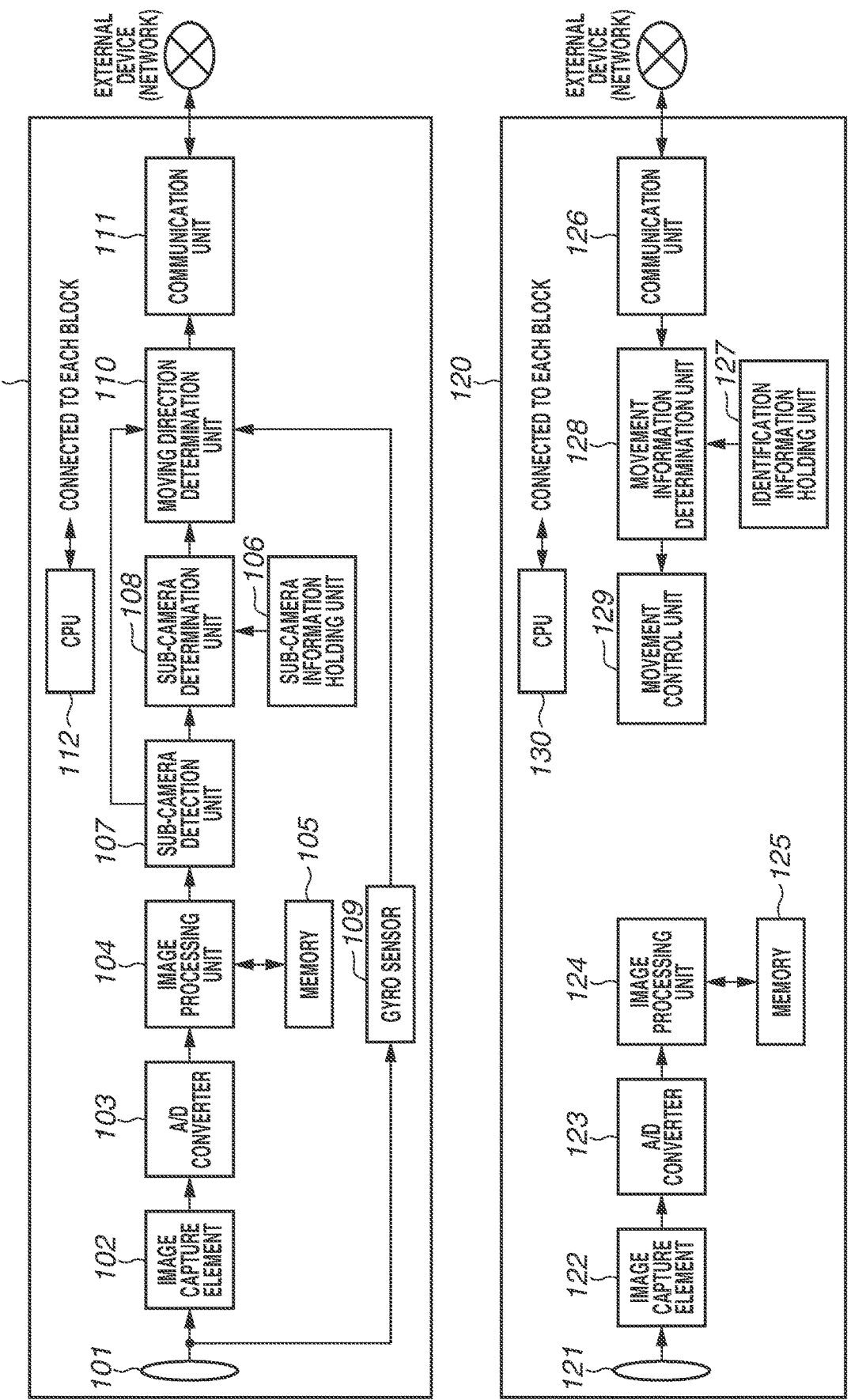
FIG. 1 is a block diagram illustrating an example of a configuration of an image capture system according to a first exemplary embodiment.

FIG. 1 is a block diagram illustrating an example of a configuration of an image capture system according to the first exemplary embodiment. In FIG. 1, a main camera 100 includes a lens group 101, an image capture element 102, an analog-to-digital (A/D) converter 103, and an image processing unit 104. Similarly, a sub-camera 120 includes a lens group 121, an image capture element 122, an A/D converter 123, and an image processing unit 124. The main camera 100 and the sub-camera 120 can communicate with each other via communication units 111 and 126.

The lens groups 101 and 121 each include optical elements such as a zoom lens, a focus lens, and an aperture.

The image capture element 102 forms a subject image input via the lens group 101. The subject image formed on the image capture element 102 is photoelectrically converted by the A/D converter 103 and output as an image signal to the image processing unit 104. Similarly in the sub-camera 120, a subject image formed on the image capture element 122 is output as an image signal from the A/D converter 123 to the image processing unit 124.

The image processing units 104 and 124 process the image signals (digital images) generated by the A/D converters 103 and 123, respectively. The image processing units 104 and 124 each perform a predetermined process on the image signal generated from the subject image, and output image data such as a luminance signal and a color signal for each pixel. The image processing units 104 and 124 each include a digital signal processor (DSP) to perform predetermined image processing such as color conversion on the digital signal, gamma processing for performing gradation conversion of a signal-processed image, and noise reduction processing. The image processing units 104 and 124 can also generate image data to be output and calculate imaging parameters for controlling an image capture apparatus.

Examples of the imaging parameters include parameters used in aperture control, focusing control, and white balance control for adjusting color tone. Here, in the main camera 100, a set of operations for driving the lens group 101, the image capture element 122, the A/D converter 103, and the image processing unit 104 to acquire a surrounding subject image and acquire image data is referred to as an image capturing operation. Similarly in the sub-camera 120, an image capturing operation is performed by driving the lens group 121, the image capture element 122, the A/D converter 123, and the image processing unit 124.

The image processing units 104 and 124 each perform image processing for recording on the captured image data to generate image data for recording, and the image data for recording is then recorded in a recording unit. Image processing for display is performed on the captured image data to generate display image data, and the display image data is then displayed on a display unit.

Memories 105 and 125 are memories used by the image processing unit 104 or 124.

A sub-camera information holding unit 106 stores information on sub-cameras connected thereto (cooperating therewith) via the communication units 111 and 126, which will be described below.

A sub-camera detection unit 107 detects the sub-camera 120 included in an imaging area of the main camera 100. Examples of a method of detecting the sub-camera 120 may include, but not limited to, detecting the sub-camera 120 from the captured image data by using subject recognition, and detecting the sub-camera 120 through wireless communication using a radio frequency (RF) tag.

A sub-camera determination unit 108 identifies a sub-camera based on sub-camera information stored in the sub-camera information holding unit 106 and detection information from the sub-camera detection unit 107.

A gyro sensor 109 detects a motion (moving direction) of the main camera 100.

A moving direction determination unit 110 determines a moving direction of the sub-camera 120 based on information from the sub-camera detection unit 107 and the gyro sensor 109.

The communication units 111 and 126 are each connected to an external device or an external network. In the first exemplary embodiment, the communication unit 111 transmits movement information determined by the moving direction determination unit 110 to the sub-camera 120. The communication unit 126 receives the movement information transmitted from the main camera 100 via the communication unit 111.

Central processing units (CPUs) 112 and 130 are each connected to corresponding control blocks via a transmission line (bus) to control the entire main camera 100 and the entire sub-camera 120, respectively. The CPUs 112 and 130 each include memories (a read only memory (ROM) and a random access memory (RAM)) control the corresponding functional blocks of the main camera 100 and the sub-camera 120, and perform calculations for the control in accordance with a program loaded from the ROM. The memory (ROM) stores a control program to be executed by the CPU and various constant values for executing the program. The memory (RAM) is an area for storing various temporary data for executing the program.

An identification information holding unit 127 holds identification information for identifying the sub-camera 120 including the identification information holding unit 127.

A movement information determination unit 128 determines whether the movement information received by the communication unit 126 is information for instructing the sub-camera 120 itself to move by comparing the movement information with the identification information held by the identification information holding unit 127.

A movement control unit 129 controls movement of the sub-camera 120 based on a result from the movement information determination unit 128.

Figure 2:
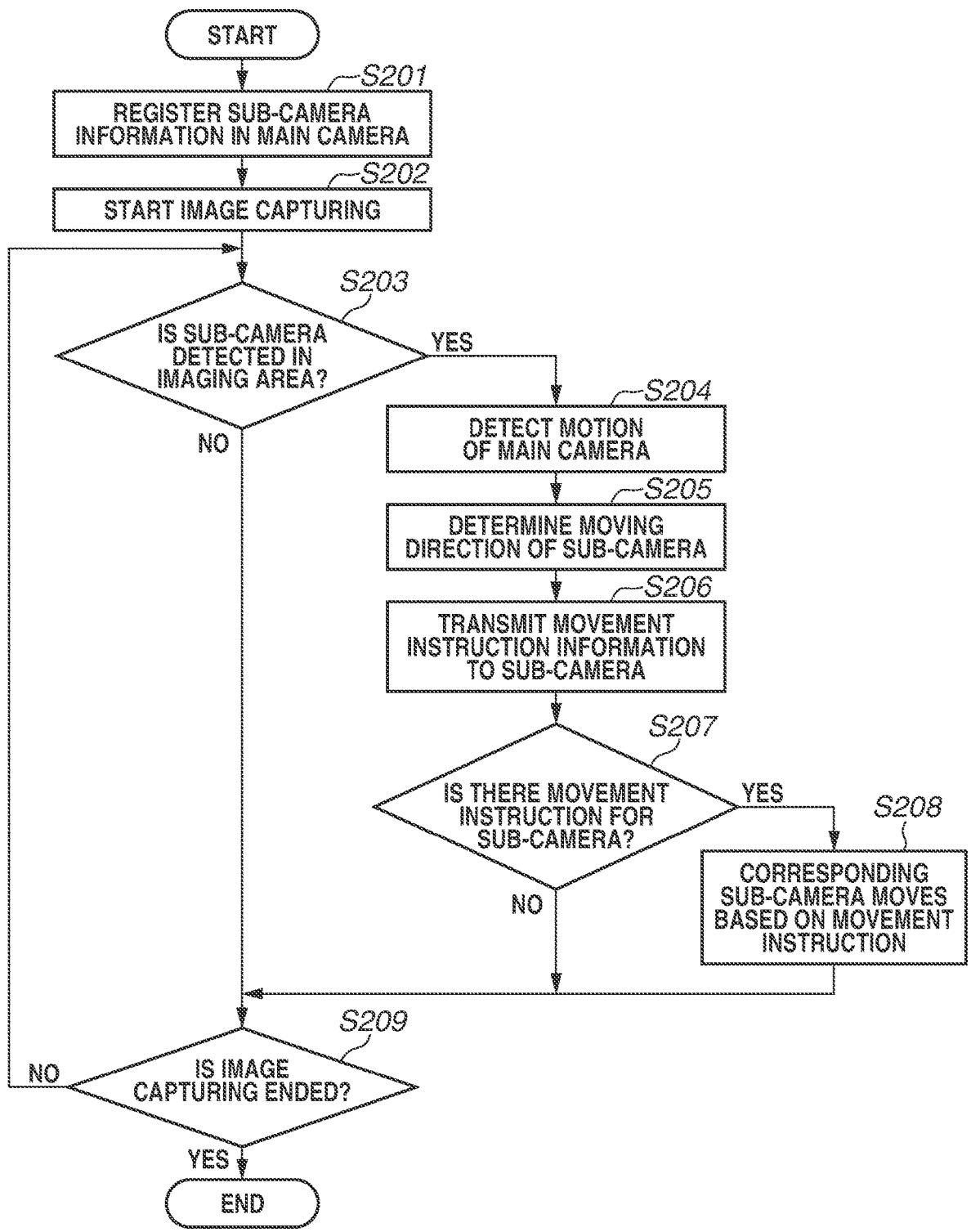
FIG. 2 is a flowchart illustrating a processing flow of the image capture system according to the first exemplary embodiment.

FIG. 2 is a flowchart illustrating a processing flow of the image capture system according to the first exemplary embodiment. In the main camera 100 and the sub-camera 120, the processing flow is performed by the CPUs 112 and 130 controlling the corresponding processing blocks of the respective cameras, and is realized when the CPUs 112 and 130 load and execute a program stored in the respective memories (ROMs).

This flowchart is started when the main camera 100 and the sub-camera 120 are connected to each other via the communication units 111 and 126 and thus enter a state where the main camera 100 and the sub-camera 120 can cooperate with each other. For example, the main camera 100 and the sub-camera 120 may be configured to start cooperating with each other in response to a user operation, or the main camera 100 and the sub-camera 120 may be configured to enter a cooperation mode under predetermined conditions, such as when the main camera 100 and the sub-camera 120 are within a predetermined distance range. However, the conditions for starting the cooperation are not limited thereto.

When the main camera 100 and the sub-camera 120 has started to cooperate with each other, in step S201, the main camera 100 acquires the identification information of the sub-camera 120 via communication and registers the received identification information as sub-camera information in the sub-camera information holding unit 106.

In step S202, the main camera 100 starts image capturing. Here, the image capturing may be started, for example, when an image capturing mode is entered, in response to an image capturing ready instruction (SW1), or when moving image capturing is started. The captured image is displayed as a live view image on the display unit.

In step S203, detection of the sub-camera 120 in the imaging area of the main camera 100 is performed to determine whether the sub-camera 120 is detected. In a case where the sub-camera 120 is detected (Yes in step S203), the processing proceeds to step S204, and if the sub-camera 120 is not detected (No in step S203), the processing proceeds to step S209.

In step S204, a motion of the main camera 100 is detected. In the first exemplary embodiment, the motion of the main camera 100 is detected based on an output of the gyro sensor 109.

In step S205, a moving direction of the sub-camera 120 is determined based on the position of the sub-camera 120 detected in step S203 and the motion of the main camera 100 detected in step S204. A method of determining the moving direction will be described in detail below with reference to FIG. 3.

Next, in step S206, movement instruction information is transmitted to the network via the communication unit 111, and then the sub-camera 120 receives the movement instruction information via the communication unit 126.

In the following step S207, it is determined whether the received movement instruction is directed to the corresponding sub-camera 120. In a case where the received movement instruction is a movement instruction for the corresponding sub-camera 120 (Yes in step S207), the processing proceeds to step S208. Otherwise (No in step S207), the processing proceeds to step S209. In a configuration in which the movement instruction information for the corresponding sub-camera 120 is to be received, such as in a case where the main camera 100 and the sub-camera 120 are in one-to-one cooperation, the determination in step S207 may not be necessary. In such a case, the determination in step S207 is skipped and then the processing proceeds to step S208.

In step S208, the sub-camera 120 moves based on the received instruction information.

Finally in step S209, in a case where the image capturing by the main camera 100 is ended (Yes in step S209), this processing flow is ended. The end of image capturing is determined depending on a particular case, for example, a case where the mode is switched to another mode, such as a playback mode other than the image capturing mode, a case where the acquired image is recorded, and a case where moving image capturing is stopped. If the image capturing is continued (No in step S209), the processing returns to step S203, and the processes of steps S203 to S209 are repeated until the image capturing is ended. In parallel with this flow, the main camera 100 and the sub-camera 120 can execute an operation of recording the captured image in accordance with an image capturing instruction through a user operation or a predetermined condition.

Figure 3:
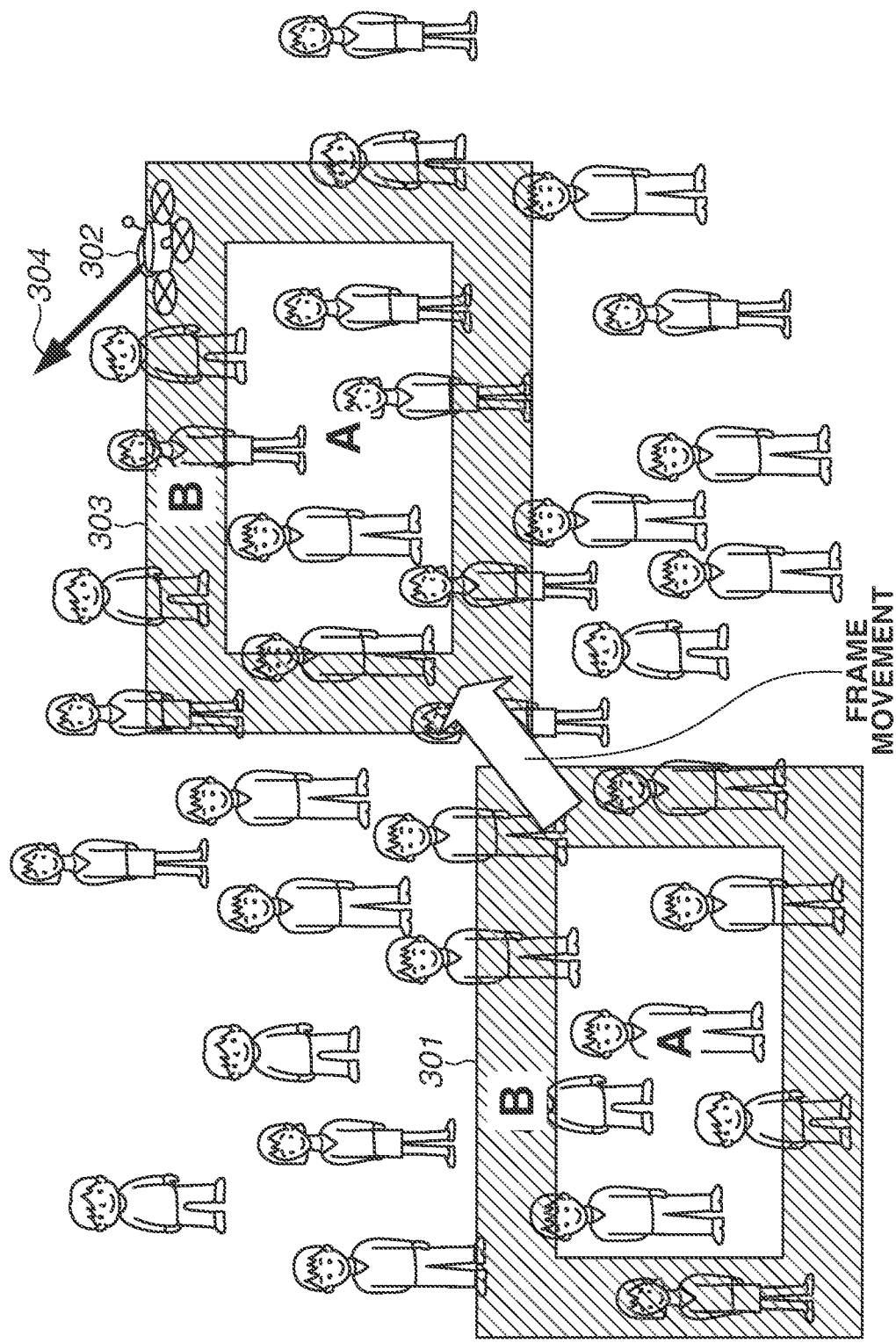
FIG. 3 is a diagram illustrating an image of an example of how to determine a moving direction of the image capture system according to the first exemplary embodiment.

FIG. 3 is a diagram illustrating an image of an example of a method of determining a moving direction of the image capture system according to the first exemplary embodiment. A frame 301 and a frame 303 each represent an imaging area of the main camera 100. In the imaging area, an unpatterned region A represents an imaging area of a recorded image, and a detection region B including the region A and a region hatched with diagonal lines on outer sides of the region A represents an area where detection of the sub-camera 120 is performed. A drone 302 is the sub-camera 120, and in the first exemplary embodiment, it is assumed that the drone 302 is an unmanned vehicle capable of changing an image capturing field angle (a position and an image capturing direction of the image capture apparatus).

Here, when the imaging area of the main camera 100 is moved from the frame 301 to the frame 303, the drone 302 (i.e., the sub-camera 120) enters a detection region 303B. At this time, the moving direction of the drone 302 is determined based on the motion of the main camera 100 and the position in the imaging area of the main camera 100 where the drone 302 is detected, and movement instruction information is transferred to the drone 302 (the sub-camera 120). In the example illustrated in FIG. 3, for example, a moving direction 304 that allows movement to a region not included in the frame 303 at a shorter distance and is different from the frame moving direction of the main camera 100 is determined as the moving direction.

When the drone 302 (the sub-camera 120) receives the movement instruction information, the drone 302 moves in the moving direction 304 based on the movement instruction information if the received information is information for the drone 302. The movement instruction information may be a combination of the moving direction and the moving speed instead of the moving direction alone.

As described above, in the first exemplary embodiment, in a case where a sub-camera is detected by the main camera, a movement instruction to the sub-camera is issued, so that it is possible to prevent the sub-camera from being reflected in the captured image of the main camera.

In the first exemplary embodiment, the sub-camera has been described as an unmanned vehicle capable of changing an image capturing field angle (an image capturing position and an image capturing direction) but is not limited thereto. Similarly, the main camera is not limited to a manned or unmanned vehicle. For example, in a case of a manned vehicle capable of changing an image capturing field angle (an image capturing position and an image capturing direction) in response to a user operation, a configuration may be provided in which a received movement instruction is displayed on the display unit to notify the movement instruction.

In the first exemplary embodiment, the main camera includes a single image capture unit. However, an image capture unit for recording images and an image capture unit for detection may be provided separately. In the first exemplary embodiment, the main camera determines the moving direction. Instead, the sub-camera may determine the moving direction based on information from the main camera. In the first exemplary embodiment, the motion of the main camera is detected by the gyro sensor, but is not limited thereto. For example, the motion of the main camera may be determined from information on the captured image. In the first exemplary embodiment, a configuration is employed in which the detection region is wider than the recorded image region, but is not limited thereto.

A second exemplary embodiment will be described. An image capture system according to the second exemplary embodiment will be described in detail in FIGS. 4 and 5. The second exemplary embodiment is different from the first exemplary embodiment in that the determination for a movement instruction from the main camera is different depending on an operation mode of the sub-camera. The elements having substantially the same functions as those of the first exemplary embodiment are designated by the same reference numerals, and the description thereof will be omitted.

Figure 4:
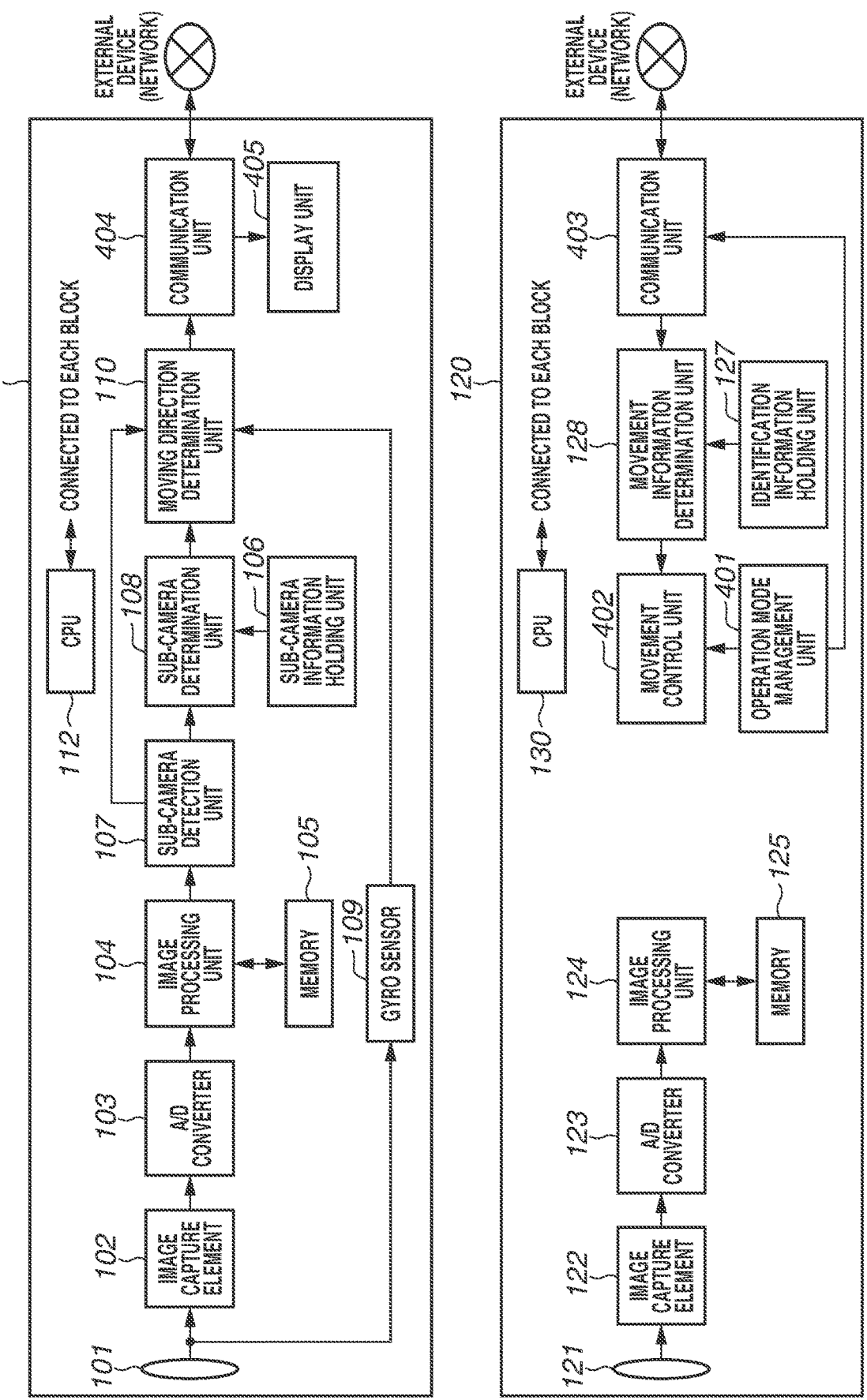
FIG. 4 is a block diagram illustrating an example of a configuration of an image capture system according to a second exemplary embodiment.

FIG. 4 is a block diagram illustrating an example of a configuration of an image capture system according to the second exemplary embodiment.

In the second exemplary embodiment, the sub-camera 120 includes an operation mode management unit 401, a movement control unit 402, and a communication unit 403. The main camera 100 includes a communication unit 404 and a display unit 405.

The operation mode management unit 401 manages which operation mode the sub-camera 120 is currently operating in.

The movement control unit 402 controls movement of the sub-camera 120 based on a result of the identification performed by the movement information determination unit 128 and information on the current operation mode acquired from the operation mode management unit 401.

The communication unit 403 is a communication unit of the sub-camera 120, receives information from the communication unit 404 of the main camera 100, which will be described below, and also transmits the operation mode information to the main camera 100.

The communication unit 404 is a communication unit of the main camera 100, transmits movement instruction information determined by the moving direction determination unit 110 to the sub-camera 120, and also receives operation mode information from the sub-camera 120.

The display unit 405 is a display unit included in the main camera 100, displays a live view image (LV image) in an imaging area, displays a REC review image after image capturing, and plays back an image recorded in a storage medium. In the second exemplary embodiment, the display unit 405 can display an operation mode of the sub-camera 120. The display unit 405 may be configured to display a menu screen and a setting screen and to instruct another device such as the main camera 100 or the sub-camera 120 via a network in response to a user operation on such display.

Figure 5:
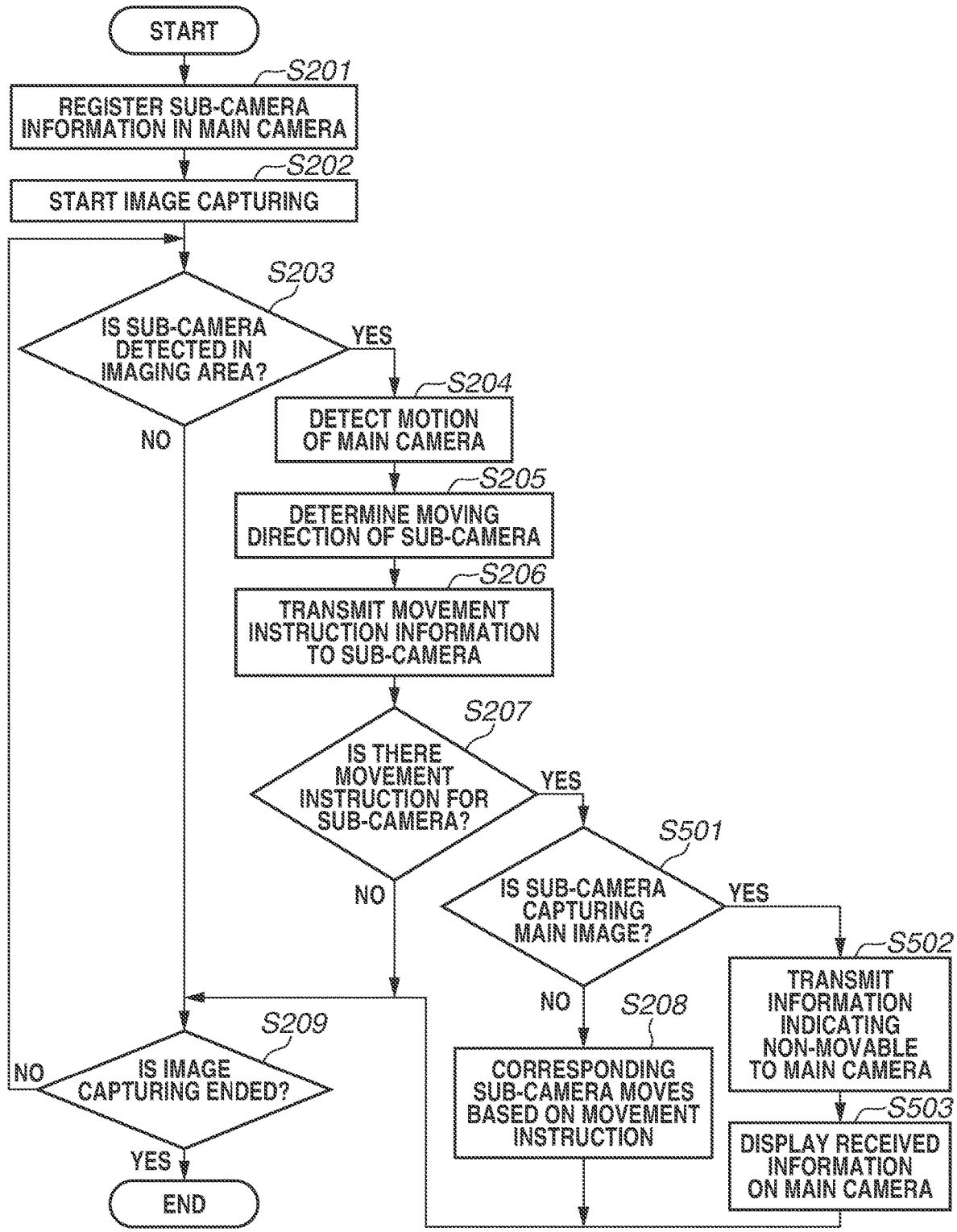
FIG. 5 is a flowchart illustrating a processing flow of the image capture system according to the second exemplary embodiment.

FIG. 5 is a flowchart illustrating a processing flow of the image capture system according to the second exemplary embodiment. In the main camera 100 and the sub-camera 120, the processing flow is performed by the CPUs 112 and 130 controlling the corresponding processing blocks of the respective cameras, and is realized when the CPUs 112 and 130 load and execute a program stored in the respective memories (ROMs). In FIG. 5, the processes of steps S201 to S209 are similar to those of FIG. 2, and thus, the description thereof will be omitted.

If a movement instruction is given to the corresponding sub-camera 120 in step S207 (Yes in step S207), the processing proceeds to step S501.

In step S501, it is determined whether an operation mode of the sub-camera 120 to which the movement instruction is given is a main-image capturing mode for capturing a main image for recording. If a main image is being captured (Yes in step S501), the processing proceeds to step S502, and if a main image is not being captured (No in step S501), the processing proceeds to step S208.

If the processing proceeds to step S502, information indicating that the sub-camera 120 is not movable is transmitted to the main camera 100 without following the movement instruction from the main camera 100.

In the following step S503, the main camera 100 displays the received information indicating that the sub-camera 120 is not movable on the display unit 405.

Then, the processing proceeds to step S209, and the processing flow is ended in a case where the image capturing is ended (Yes in step S209). This processing flow is repeated by loop processing until the end of image capturing, and thus, if the sub-camera 120 is no longer in the main-image capturing mode, the sub-camera 120 executes moving in accordance with the movement instruction.

In the second exemplary embodiment, the main camera includes a single image capture unit. However, an image capture unit for recording images and an image capture unit for detection may be provided separately. In the second exemplary embodiment, the main camera determines the moving direction. Instead, the sub-camera may determine the moving direction based on information from the main camera. In the second exemplary embodiment, the motion of the main camera is detected by the gyro sensor, but is not limited thereto. For example, the motion of the main camera may be determined from information on the captured image.

In the second exemplary embodiment, the operation mode of the sub-camera has been described using an example configuration in which the sub-camera does not follow the movement instruction from the main camera when the sub-camera is being capturing the main image. However, the configuration is not limited thereto, and, for example, the sub-camera may be configured not to follow the received movement instruction also when the sub-camera is moving due to a case where the sub-camera is in an evaluation value acquisition mode or other factors. Alternatively, the sub-camera may be configured to move based on the received movement instruction in a case where a predetermined mode such as the main-image capturing mode is exited even if the movement instruction is ignored.

Next, a third exemplary embodiment will be described. An image capture system according to the third exemplary embodiment will be illustrated in detail in FIGS. 6 and 7. The third exemplary embodiment is different from the first and second exemplary embodiments in that the main camera 100 switches an image capturing operation depending on a detection state of the sub-camera 120. The elements having substantially the same functions as those of the first and second exemplary embodiments are designated by the same reference numerals, and the description thereof will be omitted.

Figure 6:
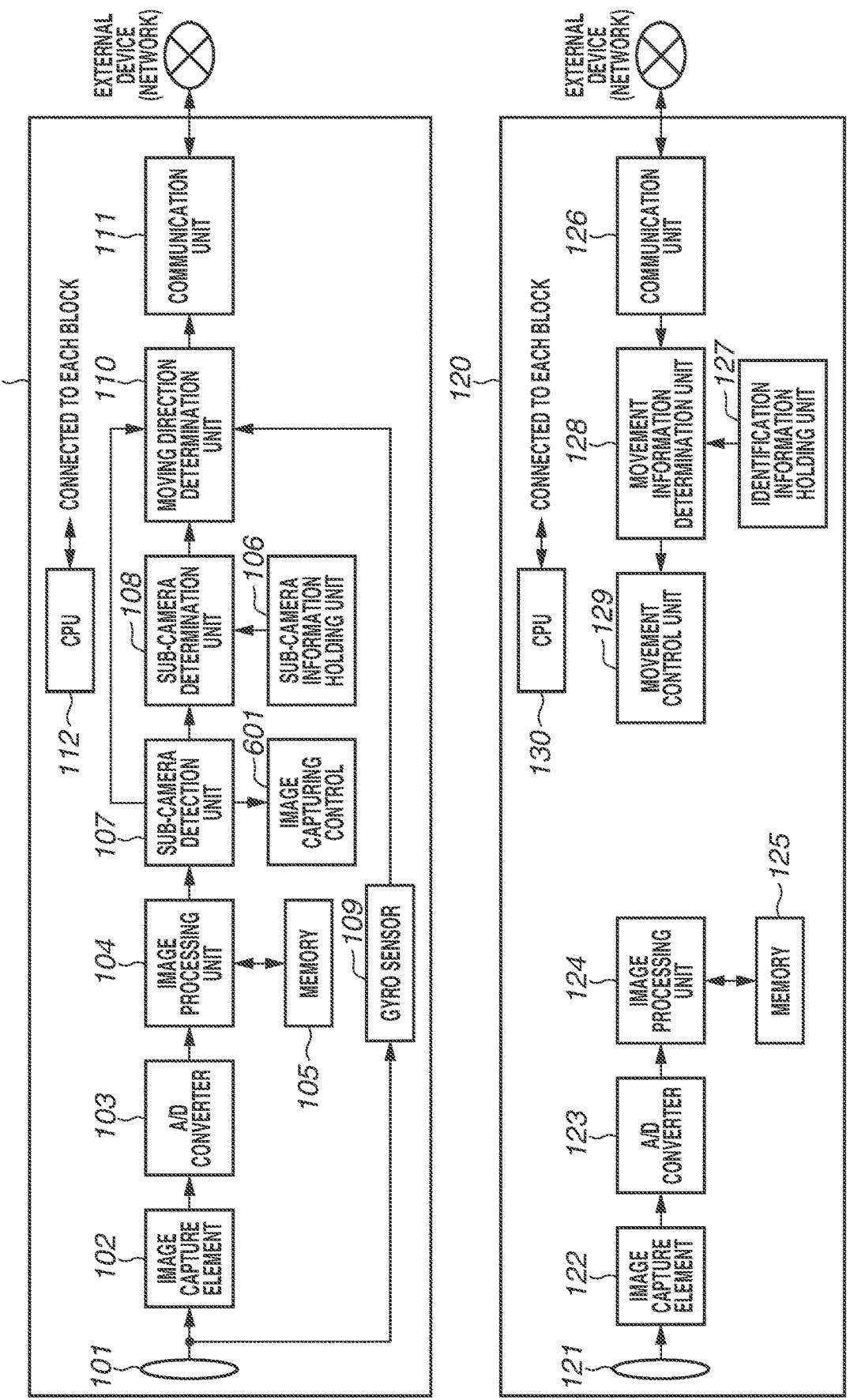
FIG. 6 is a block diagram illustrating an example of a configuration of an image capture system according to a third exemplary embodiment.

FIG. 6 is a block diagram illustrating an example of a configuration of an image capture system according to the third exemplary embodiment. The main camera 100 according to the third exemplary embodiment further includes an image capturing control unit 601.

The image capturing control unit 601 controls an image capturing operation of the main camera 100 according to a result of detecting the sub-camera 120 by the sub-camera detection unit 107.

Figure 7:
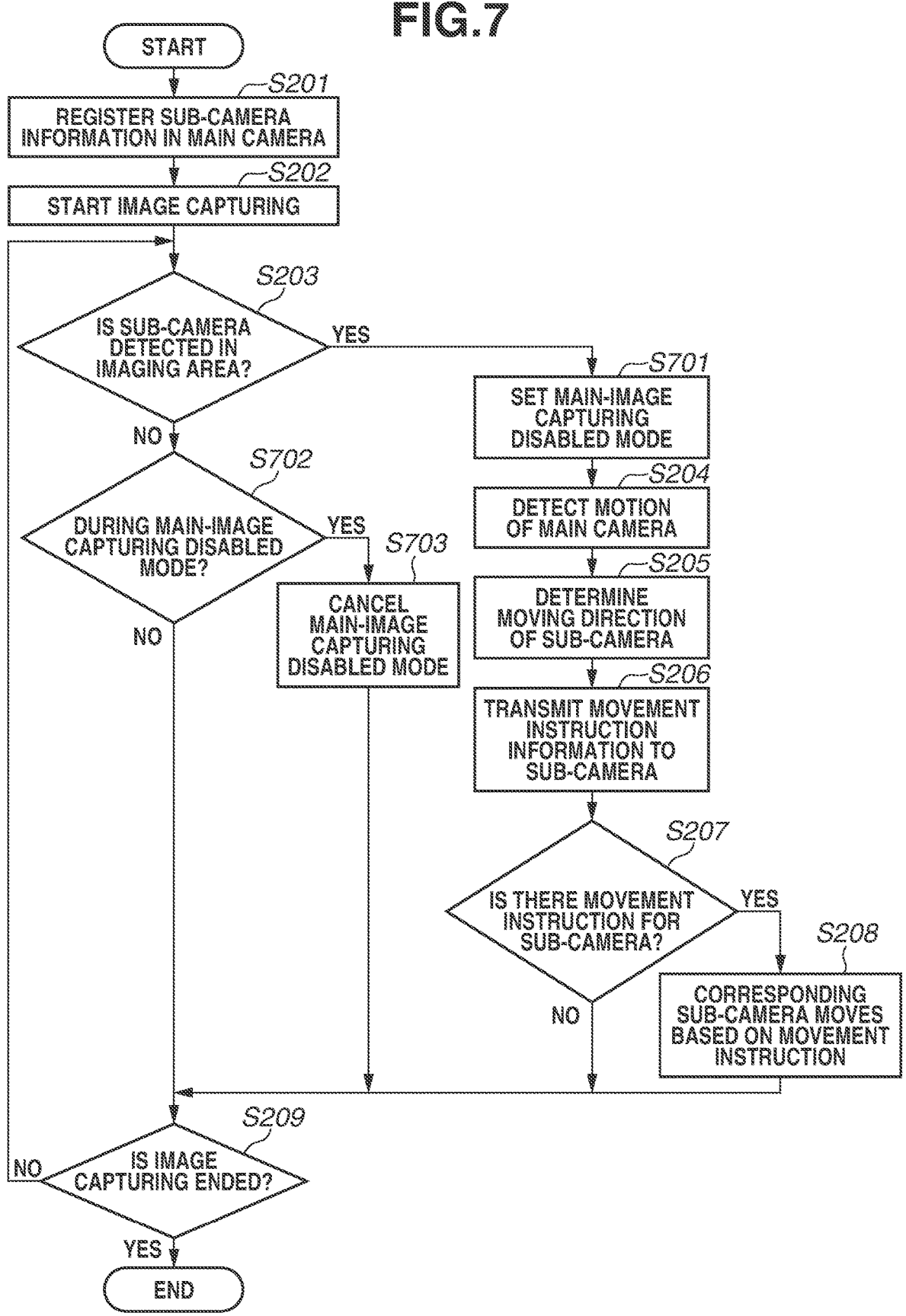
FIG. 7 is a flowchart illustrating a processing flow of the image capture system according to the third exemplary embodiment.

FIG. 7 is a flowchart illustrating a processing flow of the image capture system according to the third exemplary embodiment. In the main camera 100 and the sub-camera 120, the processing flow is performed by the CPUs 112 and 130 controlling the corresponding processing blocks of the respective cameras, and is realized when each of the CPUs 112 and 130 loads and executes a program stored in the memory (ROM). In FIG. 7, the processes of steps S201 to S209 are similar to those of FIG. 2, and thus, the detailed description thereof will be omitted.

In a case where the sub-camera 120 is detected in an imaging area of the main camera 100 in step S203 (Yes in step S203), the processing proceeds to step S701, and otherwise (No in step S203), the processing proceeds to step S702.

In step S701, the main camera 100 is set to a main-image capturing disabled mode. In the main-image capturing disabled mode, for example, even if a shutter button of the main camera 100 is pressed to give an image capturing instruction, a captured image cannot be recorded. After that, the processing proceeds to step S204. The subsequent flow is similar to that of the first and second exemplary embodiments described above, and thus, the detailed description thereof will be omitted.

On the other hand, if the processing proceeds to step S702, it is determined whether the main camera 100 is in the main-image capturing disabled mode. In a case where it is determined that the main camera 100 is in the main-image capturing disabled mode (Yes in step S702), the processing proceeds to step S703. In a case where it is determined that the main camera 100 is not in the main-image capturing disabled mode (No in step S702), the processing proceeds to step S209.

In a case where the sub-camera is not detected in step S203 (No in step S203) and the main camera 100 is in the main-image capturing disabled mode in step S702 (Yes in step S702), the processing proceeds to step S703 to cancel the main-image capturing disabled mode. Then, the processing proceeds to step S209, and the processing flow is ended in a case where the image capturing is ended (Yes in step S209).

The embodiments of the disclosure have been described above, but the disclosure is not limited to the above embodiments, and modifications can be appropriately applied depending on the target circuit form within the scope of the technical idea of the disclosure. Although the disclosure is not limited to the above embodiments and includes various forms without departing from the spirit of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-028054, filed Feb. 21, 2020, which is hereby incorporated by reference herein in its entirety.

What is claimed is:

1. An image capture system comprising:
   a first image capture apparatus;
   a second image capture apparatus;
   a determination unit of the first image capture apparatus configured to determine whether the second image capture apparatus is in an imaging area of an image capture unit included in the first image capture apparatus; and
   an instruction unit of the first image capture apparatus configured to instruct the second image capture apparatus to move outside the imaging area of the image capture unit included in the first image capture apparatus in a case where the second image capture apparatus is in the imaging area of the image capture unit included in the first image capture apparatus.

2. The image capture system according to claim 1, further comprising:
   a determination unit of the second image capture apparatus configured to determine whether the first image capture apparatus is in an imaging area of an image capture unit included in the second image capture apparatus; and
   an instruction unit of the second image capture apparatus configured to instruct the first image capture apparatus to move outside the imaging area of the image capture unit included in the second image capture apparatus in a case where the first image capture apparatus is in the imaging area of the image capture unit included in the second image capture apparatus.

3. The image capture system according to claim 1, wherein the instruction unit of the first image capture apparatus instructs the second image capture apparatus to move by displaying the instruction to move on a display unit included in the second image capture apparatus.

4. The image capture system according to claim 1, wherein the second image capture apparatus is a movable unmanned vehicle and includes a control unit configured to move the second image capture apparatus, based on an instruction from the instruction unit of the first image capture apparatus.

5. The image capture system according to claim 1, wherein the imaging area is wider than an area to be recorded as an image by the first image capture apparatus.

6. The image capture system according to claim 2, wherein the instruction unit of the first image capture apparatus determines a moving direction of the second image capture apparatus, based on a position of the second image capture apparatus in which the second image capture apparatus is detected in the imaging area of the image capture unit included in the first image capture apparatus.

7. The image capture system according to claim 6, wherein the instruction unit of the first image capture apparatus further determines the moving direction of the second image capture apparatus based on a motion of the first image capture apparatus.

8. The image capture system according to claim 4, wherein the control unit controls the second image capture apparatus not to move in accordance with the instruction to move in a case where the second image capture apparatus is in capturing an image.

9. The image capture system according to claim 2, further comprising an image capturing control unit configured to perform a control such that the first image capture apparatus does not record a captured image in a case where the second image capture apparatus is in the imaging area of the image capture unit included in the first image capture apparatus.

10. An image capture apparatus comprising:
    an image capture unit configured to capture an image;
    a communication unit configured to communicate with another image capture apparatus;

a determination unit configured to determine whether the another image capture apparatus is in an imaging area of the image capture unit; and an instruction unit configured to instruct the another image capture apparatus to move outside of the imaging area of the image capture unit in a case where the another image capture apparatus is in the imaging area of the image capture unit.

11. The image capture apparatus according to claim 10, further comprising a recording unit configured to record a captured image, wherein the imaging area of the image capture unit is wider than an area of an image to be recorded.

12. The image capture apparatus according to claim 10, wherein the instruction unit determines a moving direction of the another image capture apparatus, based on a position of the another image capture apparatus in which the another image capture apparatus is detected in the imaging area of the image capture unit.

13. The image capture apparatus according to claim 12, further comprising a motion detection unit configured to detect a motion of the image capture apparatus, wherein the instruction unit further determines a moving direction of the another image capture apparatus based on the detected motion.

14. The image capture apparatus according to claim 11, wherein the recording unit does not record the captured image in a case where the determination unit determines that the another image capture apparatus is in the imaging area of the image capture unit.

15. A method comprising:

causing a determination unit of a first image capture apparatus to determine whether a second image capture apparatus is in an imaging area of an image capture unit included in the first image capture apparatus; and causing an instruction unit of the first image capture apparatus to instruct the second image capture apparatus to move outside of the imaging area of the image capture unit included in the first image capture apparatus in a case where the second image capture apparatus is in the imaging area of the image capture unit included in the first image capture apparatus.

16. The method according to claim 15, further comprising:

causing a determination unit of the second image capture apparatus to determine whether the first image capture apparatus is in an imaging area of an image capture unit included in the second image capture apparatus; and causing an instruction unit of the second image capture apparatus to instruct the first image capture apparatus to move outside the imaging area of the image capture unit included in the second image capture apparatus in a case where the first image capture apparatus is in the imaging area of the image capture unit included in the second image capture apparatus.

17. The method according to claim 15, further comprising causing the instruction unit of the first image capture apparatus to instruct the second image capture apparatus to move by displaying the instruction to move on a display unit included in the second image capture apparatus.

18. A non-transitory storage medium that stores a program causing a computer to perform a method, the method comprising:

causing a determination unit of a first image capture apparatus to determine whether a second image capture apparatus is in an imaging area of an image capture unit included in the first image capture apparatus; and causing an instruction unit of the first image capture apparatus to instruct the second image capture apparatus to move outside of the imaging area of the image capture unit included in the first image capture apparatus in a case where the second image capture apparatus is in the imaging area of the image capture unit included in the first image capture apparatus.

19. The non-transitory storage medium according to claim 18, further comprising:

causing a determination unit of the second image capture apparatus to determine whether the first image capture apparatus is in an imaging area of an image capture unit included in the second image capture apparatus; and causing an instruction unit of the second image capture apparatus to instruct the first image capture apparatus to move outside the imaging area of the image capture unit included in the second image capture apparatus in a case where the first image capture apparatus is in the imaging area of the image capture unit included in the second image capture apparatus.

20. The non-transitory storage medium according to claim 18, further comprising causing the instruction unit of the first image capture apparatus to instruct the second image capture apparatus to move by displaying the instruction to move on a display unit included in the second image capture apparatus.

* * * * *